United States Patent [19]

Elliott

[11] Patent Number: 4,568,487

[45] Date of Patent: Feb. 4, 1986

[54] DEPLETED-URANIUM RECOVERY FROM AND CLEANING OF TARGET SANDS

[76] Inventor: Guy R. B. Elliott, 133 La Senda Rd., Los Alamos, N. Mex. 87544

[21] Appl. No.: 446,477

[22] Filed: Jan. 18, 1983

[51] Int. Cl.$^4$ .......................... G21F 9/28; C01G 43/01
[52] U.S. Cl. .......................................... 252/626; 423/5
[58] Field of Search ........................... 423/5, 8, 18, 20; 252/626

[56] References Cited

U.S. PATENT DOCUMENTS

| 3,310,385 | 3/1967 | Vondra | 423/8 |
| 3,322,509 | 5/1967 | Vogg | 423/5 |
| 3,981,960 | 9/1976 | Brambilla | 423/5 |
| 4,175,108 | 11/1979 | Poitte | 423/20 |

Primary Examiner—Deborah L. Kyle
Assistant Examiner—Virginia B. Caress

[57] ABSTRACT

A method is provided for cleaning depleted uranium and its associated radioactivity from target sands, for reusing many of the reactants used in the cleaning, and for recovering the depleted uranium content as uranyl nitrate. The method involves roasting and tumbling target sands with molten nitrate mixtures, followed by aqueous extraction to remove the nitrates, then nitric acid extraction to remove uranium oxides as uranyl nitrates which can be solvent extracted into organic phases.

1 Claim, 1 Drawing Figure

DEPLETED-URANIUM RECOVERY FROM AND CLEANING OF TARGET SANDS

BACKGROUND OF THE INVENTION

Depleted uranium, also called DU, is here defined as uranium alloy containing at least 75 weight percent of uranium, such uranium having less $U^{235}$ isotope content than is found in the isotopic contents of natural uranium as mined. Likewise, DU oxides are here defined as the oxidation products of DU; such oxidation products may include compounds and elemental residues of th original alloying elements in the DU which was oxidized, and the uranium may be as simple oxides or complex oxides such as sodium uranate or $MgU_2O_6$.

DU is becoming widely used in armor-penetrating projectiles. Such projectiles are often fired into sand targets in connection with field tests or personnel training. Because of the presence of low levels of readioctivity from the DU, it is difficult to dispose of the target sands when it periodically becomes necessary to replace them. Specifically, it is customary to store these sands in drums at protected locations where the drum contents cannot be scattered. Such storage is both troublesome and expensive. It would be economically desirable if the radioactive sands could be cleaned enough to be suitable for unprotected disposal.

Current practice in disposal of target sands has sometimes involved screening such sands to remove large pieces of DU plus leaches with nitric acid. However, with several of the alloy compositions used in DU, such nitric-acid leaches can leave insoluble residues which are too radioactive for uncontrolled disposal and which can be explosive. The usual treatments for dissolution of small amounts of such residues (especially where uranium containing much $U^{235}$ is involved) have been to add hydrofluoric acid in small amounts to the nitric acid or to fuse complete samples in basic salts from which the uranium can be leached with aqueous solutions such as nitric acid. However, complete dissolution of the target sands would be pointless, and the target sands will react readily with hydrofluoric acid or fused, basic salts. Therefore, new technology is needed for economic and other reasons so that the target sands may be cleaned and their DU content may be recoverd, e.g., as oxides or as uranyl nitrate.

Other prior art has shown (a) that molten nitrates are substantially inert toward sand, (b) that molten nitrates can oxidize uranium alloys, (c) that air oxidation can assist molten nitrates in converting uranium to its hexavalent state, (d) that uranium in its hexavalent state is soluble in aqueous acids such as nitric, and (e) that uranium in its hexavalent state in aqueous solution can be extracted into numerous organic solutions, thereby substantially separating the uranium from the other contents of the aqueous solution.

The combination of properties just described forms that basis of a novel method for the cleanup of target sands so as to achieve both recovery of DU oxide and substantial removal of radioactive contamination from the target sands, thereby easing the waste-management problems. Nonobviousness of the method is demonstrated by the absence of development of suitable cleanup procedures in spite of efforts (e.g., at Eglin Air Force Base) by those versed in and practicing the art of DU waste management. The potential economic value of target-sands cleanup lies in sharp reduction in the number of waste drums which must be protected and monitored. Such protection and monitoring are expensive, and there is increasing difficulty and expense in developing new waste-burial grounds and waste storage areas as the older waste areas become filled.

Therefore, a need still exists for a method of removing DU and DU oxides from target sands.

SUMMARY OF THE INVENTION

An object of this invention is a method of removing DU and DU oxides from target sands.

A further object of this invention is a method of recovering at least part of the Du content of target sands.

A still further object of this invention is a method of cleaning target sands to substantially nonradioactive condition.

A still further object of this invention is a method of controlling dust while target sands are being freed of DU-derived radioactivity.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, the method of this invention comprises:
(a) providing a container means which can be heated,
(b) adding DU-containing target sands to the said container means,
(c) adding salt mixtures comprising at least 70 weight percent of compounds from the group of nitrates comprising those of magnesium, calcium, potassium, sodium, and lithium to the said container means,
(d) heating the said target sands and the said salt mixtures together until the said DU has substantially converted to DU oxides or other oxidized species formed from the said DU,
(e) adding water to dissolve the salt component into aqueous solution and removing the aqueous solution,
(f) dissolving the said DU oxides or other oxidized species substantially into aqueous nitric acid solution, and
(g) removing the said aqueous nitric acid solutions from the said target sands and rinsing the said target sands with water, thereby washing out the dissolved uranium oxidation products.

In the preferred embodiment target sands held in a heated cement mixer are roasted and tumbled with molten-nitrate salts in an air atmosphere. The said roasting produces DU oxides which are soluble in aqueous solutions. After roasting, the target sands can be washed substantially free of radioactivity so that the sands can be discarded. The DU oxides are recovered by means such as solvent extraction.

BRIEF DESCRIPTION OF THE DRAWINGS

The accompanying drawing, which is incorporated in and forms a part of the specification, illustrates the preferred embodiment of apparatus used to implement the method of the invention here described, and, together with the description, serves to explain the principles of the invention. In the drawing.

DESCRIPTION OF THE PREFERRED EMBODIMENT

Figure 1:
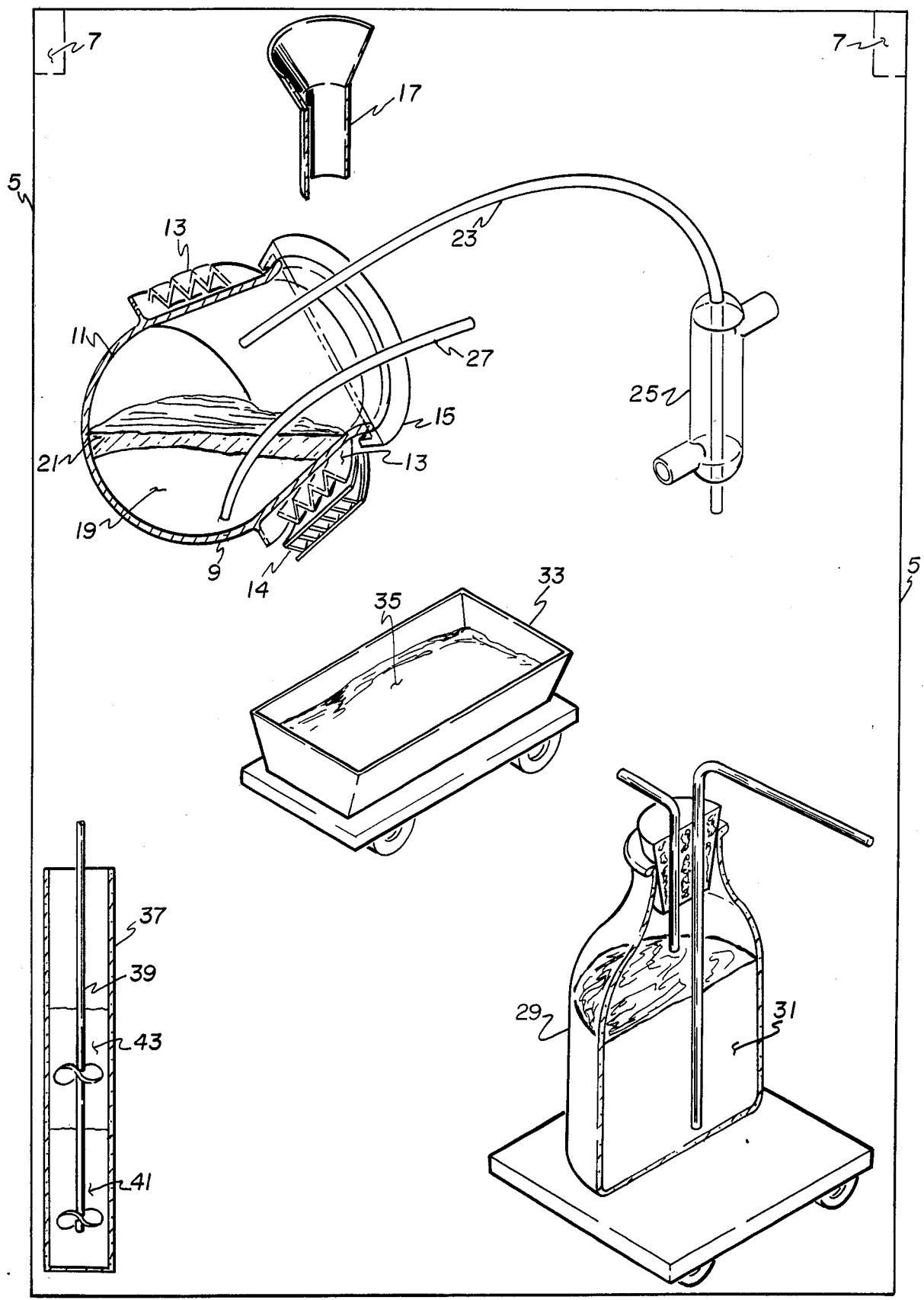
FIG. 1 is a schematic illustration in cross section of the preferred embodiment of the apparatus used to implement the method of the invention in which one or more heated cement mixers, along with associated apparatus inclduing one or more hoppers, water-vapor condensors, carts, solvent-extraction vessels, carboys, and sections of tubing are used to substantially remove DU from target sands, substantially clean the said target sands, and substantially recover DU oxides, DU compounds of other types, or both.

Referring to the drawing, in FIG. 1, within a dust-isolating region 5, e.g., a room with air filters 7, there are placed a device such as a modified cement mixer and other equipment to be discussed. The bucket 9 of the said cement mixer is lined with substantially inert materials 11 such as stainless steel. One or more heaters 13 are used to heat the bucket 9. Such heaters will have insulation 14 around them. If the insulation 14 and heaters 13 are attached directly to the bucket 9, the bucket will become an integral part of the furnace, a useful design feature under some circumstances. However, the insulation 14 and heaters 13 may not be attached to, but may merely surround, the bucket 9 in which case there is formed an external furnace. Rotating the bucket 9 tumbles and mixes its contents, and tilting the bucket 9 allows loading or dumping of the contents of the bucket. A movable lid 15 is available for placing on the bucket 9. such a lid allows the bucket 9 to rotate while the lid 15 is stationary. Alternatively, but not shown, a lid may be fixed to the bucket 9 with turning permitted elsewhere.

To start the DU-removal process to clean target sands, the bucket 9 is loaded after first removing the lid 15 and tilting the bucket to where the hopper 17 can dump target sands 19 into the bucket 9. Then onto the target sands 19 there is loaded an aqueous solution 21 of a salt mixture comprising at least 70 weight percent of compounds from the group of nitrates comprising those of magnesium, calcium, potassium, sodium, and lithium. Next, the bucket 9 is tilted to the position shown in the figure, and the movable lid 15 is attached to the bucket.

When the aqueous solution 21 is present in the rotating bucket 9, the solution will substantially suppress the escape of radioactive dust from the bucket. Likewise, when the solution 21 has converted (as will be discussed) to molten salts, the said salts also will suppress the escape of radioactive dust.

A removable first tube 23 through the movable lid 15 connects the bucket 9 to a water-vapor condenser 25. When the bucket 9 is heated by heaters 13, water vaporizes from the aqueous solution 21 to the condenser 25 where the said vapor is condensed for reuse. Water vaporization is assisted as desired by blowing air through a second tube 27 and into the region of the target sands 19. Condensed water moves to a carboy 29.

Water vaporizatio from the aqueous solution 21 allows the temperature to rise in the bucket 9, producing concentrated solutions and, eventually, molten salt mixtures. The said concentrated solutions, or the said molten salt mixtures, or both, will attack the DU present, forming DU oxides. During the formation of the DU oxides, the bucket 9 is rotated to mix and tumble the target sands-salt mixture combination. Air blowing through second tube 27 is continued to assist formation of the said DU oxides and to conserve nitrates whose decomposition would be required to oxidize the DU if air were not present.

The said oxidation of the DU may be assisted by additives in the molten salt mixture producted from the aqueous solution 21. Some of these additives may not go completely into solution in the molten salt mixture or the aqueous solution, but, in those cases, the terms "molten salt mixture" and "aqueous solution" are broadened to include such slurries. Potentially appropriate additives include: Chlorides, fluorides, or both, may be added for reasons such as to prevent the formation of unreactive films on the DU as it oxidizes. Water added, or still present from the original aqueous solution 21, may assist the surface-film removal from the DU and the continuing DU oxidation. Ammonium nitrate decompostion may assist the DU oxidation. Oxidizers such as peroxides, perchlorates, permanganates, or their mixtures may be useful. The choices of additives will reflect the compositions and natures of the DU alloys which are to be processed.

Depending upon a number of factors (e.g. processing schedules and the DU content of the target sands), the addition of an aqueous solution 21 may be replaced by additions of solid-salt mixtures or salt-mixture slurries.

When the DU of the target sands 19 has been substantially oxidized by heating, tumbling, and reaction in the bucket 9, the bucket may be at least partially cooled, and water is added to the said target sands-salt mixture combination in the bucket 9. The said water is supplied from a water supply 31 in a water carboy 29; this water supply is substantially water vaporized from the starting aqueous solution 21 and condensed at the condenser 25. Fluids are moved into and out of the carboys by pressure or vacuum, using methods well known to those versed in the art, and several carboys like the water carboy 29 are used in the method of the invention.

The said water added to the said target sands-salt mixture combination substantially dissolves nitrates but does not significantly dissolve sand and (unless acids or bases are present) leaves uranium oxides and mixed oxides substantially undissolved. To assure equilibrium dissolution, the bucket 9 is rotated. When the nitrate dissolution is substantially complete, the nitrate solution is withdrawn to a nitrate-salt carboy for later use as aqueous solution 21 with a new batch of target sands.

Next the DU oxides are removed from the target sands 19 by dissolution as uranyl nitrate in nitric acid, followed by nitric acid removal and water washing. During the acid dissolution of the DU oxides, it may prove useful to add oxidants to assist in oxidizing all the uranium to the hexavalent state. The nitric acid and aqueous washes, which contain uranyl nitrate after use, are reused until it becomes appropriate to recover their uranyl nitrate content. Storage is in carboys like the water carboy 29. The cleaned target sands are dumped into the cart 33 and sand substantially free of radioactivity 35 is discarded.

Periodically, in a solvent extraction vessel 37 with stirrer 39, acid and wash aqueous uranyl nitrate solutions 41 are stripped of their uranyl nitrate by extraction into organic solution 43 using procedures well known to those versed in the art.

If radioactivity analysis shows that the target sands have not been sufficiently freed of radioactivity, the DU-removal processes can be repeated.

The foregoing description of the preferred embodiment of the invention has been presented for purposes of illustration and description. It is not intended to be exhaustive or to limit the invention to the precise forms disclosed, and obviously many modifications and variations are possible in light of the above teaching. The embodiment was chosen and described in order to best explain the principles of the invention and their practical application to thereby enable others skilled in the art to best utilize the invention in various embodiments and with various modifications as are suited to the particular use contemplated. It is intended that the scope of the invention be defined by the claims appended hereto.

I claim:

1. A method of removing uranium and its oxidation products from target sands comprising:
   (a) providing a container means which can be heated,
   (b) adding uraium-containing target sands to the said container means,
   (c) adding a salt mixture comprising at least 70 weight percent of a salt selected from the group consisting of nitrates of magnesium, calcium, potassium, sodium, and lithium to said container means,
   (d) heating the said target sands and the said salt mixture together to fuse the salt and thereby to convert said uranium to uranium oxidation products,
   (e) adding water to dissolve the salt component into aqueous solution and removing the aqueous solution,
   (f) adding nitric acid to dissolve the uranium oxidation products into aqueous nitric acid solution, and
   (g) rinsing the target sands with water thereby washing out the dissolved uranium oxidation products.

* * * * *